(12) United States Patent
Albrecht

(10) Patent No.: US 9,528,847 B2
(45) Date of Patent: Dec. 27, 2016

(54) PICTURES FROM SKETCHES

(71) Applicant: Microsoft Corporation, Redmond, WA (US)

(72) Inventor: Brian Albrecht, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 534 days.

(21) Appl. No.: 13/651,470

(22) Filed: Oct. 15, 2012

(65) Prior Publication Data

US 2014/0108016 A1    Apr. 17, 2014

(51) Int. Cl.
| | |
|---|---|
| *G01C 21/36* | (2006.01) |
| *G06T 11/20* | (2006.01) |
| *G01C 21/34* | (2006.01) |
| *G06F 17/30* | (2006.01) |
| *G06T 19/20* | (2011.01) |

(52) U.S. Cl.
CPC ............ *G01C 21/367* (2013.01); *G01C 21/34* (2013.01); *G01C 21/36* (2013.01); *G06F 17/30241* (2013.01); *G06F 17/30277* (2013.01); *G06F 17/30873* (2013.01); *G06T 11/20* (2013.01); *G06T 11/206* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 7,061,501 B1 | 6/2006 | Lake et al. | |
| 7,158,878 B2 | 1/2007 | Rasmussen et al. | |
| 7,379,811 B2 | 5/2008 | Rasmussen et al. | |
| 7,865,306 B2 | 1/2011 | Mays | |
| 7,894,984 B2 | 2/2011 | Rasmussen et al. | |
| 8,014,946 B2 | 9/2011 | Rasmussen et al. | |
| 8,463,774 B1 | 6/2013 | Buron et al. | |
| 8,781,742 B2 | 7/2014 | Albrecht | |
| 8,793,068 B2 | 7/2014 | Armato | |
| 2003/0158657 A1 | 8/2003 | Agnew et al. | |
| 2006/0062463 A1 | 3/2006 | Li et al. | |
| 2006/0062465 A1 | 3/2006 | Li et al. | |
| 2006/0071915 A1 | 4/2006 | Rehm | |
| 2006/0074660 A1 | 4/2006 | Waters et al. | |
| 2006/0112123 A1 | 5/2006 | Clark et al. | |
| 2008/0137958 A1 | 6/2008 | Wang et al. | |
| 2008/0316311 A1 | 12/2008 | Albers et al. | |
| 2009/0089660 A1 | 4/2009 | Atkins et al. | |

(Continued)

OTHER PUBLICATIONS

Title: Merriam-Webster Dictionary for definition of the word Document, source: www.merriam-webster.com.*

(Continued)

*Primary Examiner* — Jwalant Amin

(74) *Attorney, Agent, or Firm* — Tom Wong; Micky Minhas

(57) ABSTRACT

A graphical sketch can be received, the sketch including one or more representations of text. A query can be automatically generated from the sketch. The generation of the query can include automatically recognizing the text and automatically representing the text in the query. The query can be run to identify a picture in response to the query, with the text describing one or more non-textual features of the picture. The picture can be returned, such as in response to the receipt of the graphical sketch.

20 Claims, 18 Drawing Sheets

(56) References Cited

U.S. PATENT DOCUMENTS

| | | | |
|---|---|---|---|
| 2009/0278848 A1 | 11/2009 | Robertson et al. | |
| 2010/0205202 A1* | 8/2010 | Yang et al. | 707/767 |
| 2011/0010241 A1 | 1/2011 | Mays | |
| 2011/0302522 A1* | 12/2011 | Cao et al. | 715/780 |
| 2011/0320114 A1 | 12/2011 | Buxton et al. | |
| 2012/0054177 A1* | 3/2012 | Wang et al. | 707/723 |
| 2012/0072410 A1* | 3/2012 | Wang et al. | 707/711 |
| 2012/0162244 A1* | 6/2012 | Ma et al. | 345/594 |
| 2012/0201468 A1* | 8/2012 | Oami et al. | 382/199 |
| 2012/0229468 A1 | 9/2012 | Lee et al. | |
| 2012/0295231 A1 | 11/2012 | Zitnick, III et al. | |
| 2012/0323931 A1 | 12/2012 | Buchmueller et al. | |
| 2013/0076746 A1 | 3/2013 | Chung et al. | |
| 2013/0104054 A1* | 4/2013 | Cao et al. | 715/753 |
| 2014/0104279 A1 | 4/2014 | Albrecht | |
| 2014/0288830 A1 | 9/2014 | Albrecht | |

OTHER PUBLICATIONS

Title: Sketch-based retrieval of drawings using spatial proximity, Author: Sousa et al., Date: 2010 Source:Journal of Visual Languages and Computing.*

Title: Query-Adaptive Shape Topic Mining for Hand-Drawn Sketch Recognition, Author: Sun et al., Date: Oct. 29, 2012 Source: 2012 ACM 978-1-4503-1089-5/12/10.*

Office Action, U.S. Appl. No. 13/652,943, filed Oct. 16, 2012, Notification Date: Sep. 23, 2013, 36 pages.

Office Action, U.S. Appl. No. 13/652,943, filed Oct. 16, 2012, Notification Date: Feb. 20, 2014, 19 pages.

"OmniGraphSketcher version 1.0 Manual", 2009, 28 pages.

Office Action, U.S. Appl. No. 13/652,682, filed Oct. 16, 2012, Notification Date: Jun. 4, 2013, 20 pages.

Office Action, U.S. Appl. No. 13/652,943, filed Oct. 16, 2012, Notification Date: Apr. 1, 2013, 25 pages.

Kopczynski, et al., "Localisation with Sketch Based Input", Retrieved at <<http://www.geo-spirit.org/publications/paper-wien-26112003.pdf>>, Proceedings of 2nd Symposium on Location Based Services & Telecartography, Vienna, Austria, Retrieved Date: Jul. 25, 2012, pp. 10.

Olsen, et al., "Sketch-Based Building Modelling", Retrieved at <<http://www.cs.auckland.ac.nz/~burkhard/Reports/GraphicsGroupTechnicalReport2011_002.pdf>>, Proceedings of Grapp 2011, Retrieved Date: Jul. 25, 2012, pp. 13.

Yang, Maria C., "Observations of Concept Generation and Sketching in Design", Retrieved at <<http://www-bcf.usc.edu/~mariayan/papers/yangManuscript.pdf>>, Proceedings of Research in Engineering Design, vol. 20, No. 1, Mar. 1, 2009, pp. 31.

Meyer, Bernd, "Pictorial Deduction in Spatial Information Systems", Retrieved at <<http://ieeexplore.ieee.org/stamp/stamplsp?tp=&arnumber=363644>>, IEEE Symposium on Visual Languages, Oct. 4, 1994, pp. 8.

Eitz, et al., "PhotoSketch: A Sketch Based Image Query and Compositing System", Retrieved at <<http://www.cg.tu-berlin.de/fileadmin/fg144/Research/Projects/PhotoSketch/PhotoSketch_sketch_lowres.pdf, Proceedings of Siggraph, Dec. 2009, pp. 3.

"Convert ink to geometry or text", Retrieved at <<http://office.microsoft.com/en-us/visio-help/convert-ink-to-geometryor-text-HP001056933.aspx>>, Retrieved Date: Sep. 10, 2012, p. 1.

"Using the New Live Trace Feature in Illustrator CS2", Retrieved at <<http://graphicssoft.about.com/od/illustrator/ss/sflivetrace.htm>>, Retrieved Date: Sep. 10, 2012, pp. 2.

Office Action, U.S. Appl. No. 14/300,262, filed Jun. 10, 2014, Notification Date: Nov. 3, 2014, 9 Pages.

Office Action, U.S. Appl. No. 13/652,943, filed Oct. 16, 2012, Notification Date: Nov. 7, 2014, 9 Pages.

Search Report, International Application No. PCT/US2013/064897, International Filing Date: Oct. 15, 2013, Applicant's Reference: 337035-04, Date of Mailing: Aug. 8, 2014, 9 Pages.

Albrecht, Brian, "Maps from Sketches", U.S. Appl. No. 13/652,682, filed Oct. 16, 2012, pp. 1-36 and Drawing Sheets 1-18.

Albrecht, Brian, "Charts from Sketches", U.S. Appl. No. 13/652,943, filed Oct. 16, 2012, pp. 1-35 and Drawing Sheets 1-18.

"SketchComm: a Tool to Support Rich and Flexible Asynchronous Communication of Early Design Ideas", Retrieved at <<http://research.microsoft.com/pubs/210389/cscw2012_sketchcomm.pdf, Feb. 11-15, 2012, pp. 359-368.

Office Action, U.S. Appl. No. 14/300,262, filed Jun. 10, 2014, Notification Date: Aug. 31, 2015, 18 Pages.

Office Action, U.S. Appl. No. 14/300,262, filed Jun. 10, 2014, Notification Date: Jan. 12, 2016, 16 Pages.

* cited by examiner

PICTURES FROM SKETCHES

BACKGROUND

For computer users, entering graphics such as pictures, maps, or charts has typically been done by entering text such as search terms in standard ways, browsing through information, making selections, and possibly repeating one or more of these acts to locate or generate a desired graphic. For example, the text may be entered with real keyboards or virtual keyboards (e.g., keyboards displayed on touch screens), along with making selections on various dialogs, menus, etc. The selections may then be used to generate and/or retrieve the desired graphics.

SUMMARY

Obtaining graphics using only the text and selection techniques discussed above can be cumbersome and limiting. This can be particularly true when using some mobile devices, such as tablet computers and mobile telephones, which may not have full functioning real keyboards. It has been found that receiving and analyzing sketches of desired graphics can be useful in retrieving such graphics in a computing device (though, of course, even using such sketches as described herein does not guarantee that a user will get the precise graphic the user is looking for in all situations). For example, the sketches can be freehand sketches (which may be entirely freehand or partially freehand) which may be input, for example, by using touch sensitive screens with styluses or fingers being used for input, and/or other input mechanisms. The sketches may include representations of text (notes) and/or purely graphical elements that can be used to convey information about graphics to be obtained using the sketches. The sketches can be analyzed and resulting information can be used to obtain desired graphics.

In one embodiment, the tools and techniques can include receiving a graphical sketch (such as receiving such a sketch from a user input at a computing device or receiving such a sketch from another computing environment where the sketch was provided as user input), the sketch including one or more representations of text. A query can be automatically generated from the sketch. The generation of the query can include automatically recognizing the text and automatically representing the text in the query. The query can be run to identify a picture in response to the query, with the text describing one or more non-textual features of the picture. The picture can be returned, such as in response to the receipt of the graphical sketch.

In another embodiment of the tools and techniques, a graphical sketch including one or more sketched representations of text can be received. A request can be sent to a picture service, the request requesting that the picture service return a picture represented by the sketch. A picture can be received from the picture service, with the picture including one or more non-textual features described by the text represented in the sketch. Additionally, the picture can be displayed.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
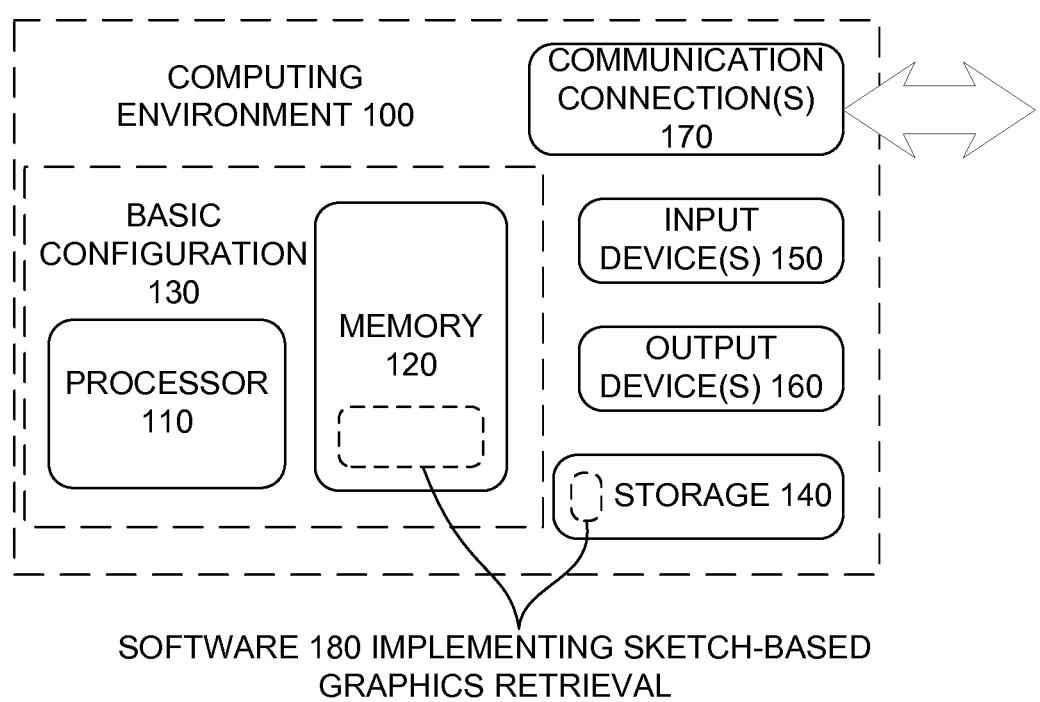
FIG. 1 is a block diagram of a suitable computing environment in which one or more of the described embodiments may be implemented.

Embodiments described herein are directed to techniques and tools for improved sketch-based graphics retrieval (i.e., generating and/or retrieving graphics using information from sketches). Such improvements may result from the use of various techniques and tools separately or in combination.

Such techniques and tools may include receiving a sketch and using the sketch to obtain one or more graphics, such as pictures, charts, or maps. The sketch may include graphical elements and representations of text, which can both be used in retrieving the graphics. For example, such a sketch may be used to automatically generate a query for a picture. The query can be sent to a picture service, and the picture service can return a picture that reflects one or more of the graphical elements, and that has graphical elements that are described by the text, even if the picture does not include the text itself. For example, the sketch may be a rough freehand sketch of a deer, and may have a representation of the text "deer" (such as with the text being freehand sketched or entered as typed text). Such a sketch can be used to construct a query for a picture that has an associated metadata tag with the term "deer" and that has graphical features similar to the sketch. For example, if the sketch of the deer is a side view, then the query may indicate a side view is requested, and metadata tags such as search indexes, etc. for the searched pictures may indicate whether the picture is a side view, a front view, a rear perspective view, a front perspective view, etc. As an alternative, search results can be returned and then compared to features of the sketch to determine how well the returned pictures each correlate to the sketch.

As another example, a received sketch may be a sketch of a map. For example, the sketch can show lines representing streets, sketched graphics of landmarks, text representing street names, text representing landmarks, etc. The sketch may also include a highlighted route between two locations. The sketch can be used to retrieve a map. For example, the sketch may be submitted in a request to a map service. The map service can analyze the graphics and textual representations of the sketch, such as by performing pattern matching techniques, to match the sketch to a map region. This can include matching sketched landmark representations (a drawing of a particular building, lake, etc.), matching streets (which can include matching street names for street names provided in the sketch), etc. with geographic locations represented by maps produced by the map service. The map service can then return a map showing a map region with a high correlation to the features shown in the sketch. The map may show landmarks represented in the sketch, even if such landmarks are not normally shown in such maps. For example, if the sketch shows "Joe's Taco Shop" on the corner of Broadway and Main, the a landmark can be shown for Joe's Taco Shop even if the mapping service would not typically show that business as a landmark on general maps of the same region. The map service can improve its level of detail based on information it receives from sketches. For example, the map service may add "Joe's Taco Shop" to its data, such as in a layer on its main map. This new information may then be used in responding to future queries, possibly to help identify maps regions and locations and/or to provide additional content when the map service responds to future queries. The returned map may also show a route that was represented in the sketch. Additionally, the map may include more details closer to the route, and fewer details farther from the route. Note that this additional and lesser details feature may be useful in maps showing routes, even if the map is not being returned in response to a sketch. Also, in addition to the returned map, directions may also be returned and presented (e.g., by providing a list of the directions and/or by having the directions be spoken).

As yet another example, a sketch of a chart may be provided. For example, such a sketch can include sketched representations of chart features such as graphical chart features (axes, bars for bar charts, columns for column charts, lines for line charts, pie sections for pie charts, etc.), labels, callouts, highlights, titles, numerical values, etc. A chart can be generated from such a sketch. Additionally, a dataset underlying the chart can also be generated from the sketch. The chart can include the chart features represented on the sketch. Additionally, the dataset can be a set of data that is consistent with the features of the chart. For example, some values in the dataset may be values that are represented in textual representations in the sketch. Other values may be new values that are derived from the sketch. For example, values may be derived using interpolation and/or extrapolation techniques using values from textual representations on the sketch, relative sizes and/or locations of graphical features on the sketch, etc. The chart and the dataset may be displayed, such as in a spreadsheet application user interface. Also, the displayed chart and dataset may be interactive and they may be linked. For example, user input may be provided to make changes to the dataset, and such changes can be automatically made to the chart (possibly after user confirmation to update the chart to match the dataset). Additionally, changes may be sketched onto the chart. For example, a sketch may be provided on the chart to add an additional callout to the chart.

As will be appreciated, one or more substantial benefits can be realized from the tools and techniques described herein, such as making it more convenient to provide user input to yield graphics, such as pictures, maps, and charts. However, the subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described embodiments may be implemented. For example, one or more such computing environments can be used as a sketch input environment and/or a graphics service environment. Generally, various different general purpose or special purpose computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing sketch-based graphics retrieval. An implementation of sketch-based graphics retrieval may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as flash drives, magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "receive," "send," "generate", and "display" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Sketch-Based Graphics Retrieval System and Environment

Figure 2:
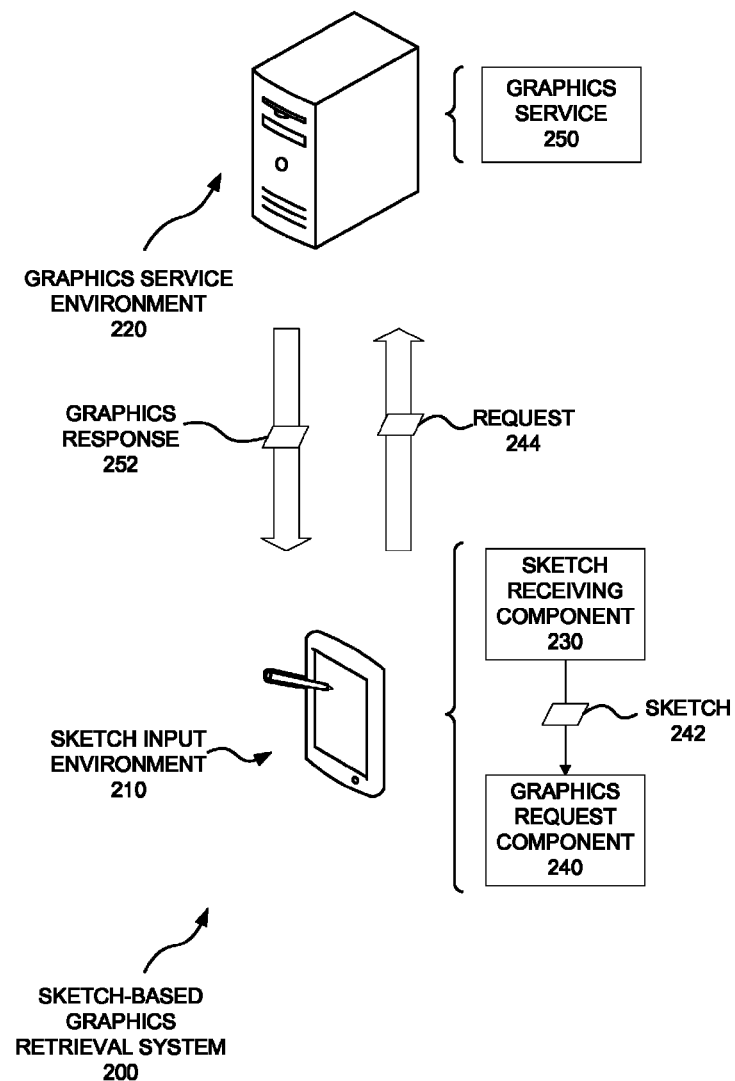
FIG. 2 is a schematic diagram of a sketch-based graphics retrieval system.

FIG. 2 is a schematic diagram of a sketch-based graphics retrieval system (200) in conjunction with which one or more of the described embodiments may be implemented. The system (200) can include a sketch input environment (210) and a graphics service environment (220).

The sketch input environment (210) can include a sketch receiving component (230), which can receive a sketch. For example, the sketch receiving component (230) may include one or more input devices to receive user input defining the sketch (touch screens, etc.), as well as software and/or hardware components for processing the input to format the sketch in a useable form. For example, the sketch receiving component (230) may produce a sketch (242) in the form of a graphics file in a graphics format (e.g., a bitmap image, a JPEG image, etc.). The sketch receiving component (230) can send the sketch (242) to the graphics request component (240). The graphics request component (240) can use the sketch (242) to produce a request (244) (e.g., a graphics service query) that can be sent to a graphics service (250) (e.g., picture service, chart service, and/or map service), which can be hosted in the graphics service environment (220). For example, the graphics request component (240) may analyze the sketch (242) to produce a graphics query (which may include instructions for the graphics service (250)), and the request (244) can include the graphics query. Alternatively, the graphics request component (240) may not analyze the sketch (242), but may include the sketch (242) in the request (244) so that the graphics service (250) can analyze the sketch (242). As yet another alternative, the graphics request component (240) may analyze the sketch to produce a query, and may include the sketch and the query in the request (244) to the graphics service.

The graphics service can analyze the request (244) to select and/or generate a graphics response (252). The graphics response (252) can include the requested graphic(s). The graphics response (252) may include a single graphic and/or multiple graphics. For example, if the request (244) is a request for a picture indicated by the sketch (242), the graphics response (252) may include multiple pictures, and user input may be provided at the sketch input environment (210) to select one or more of the pictures. As another example, the request (244) may be a request for a chart indicated by the sketch (242), and the graphics response (252) may include a single chart generated from the sketch (242). In that example, the graphics response (252) may also include other related information, such as a dataset underlying the generated chart.

Alternatively, the services/components of the sketch-based graphics retrieval system (200) can be arranged differently than what is illustrated in the example of FIG. 2. For example, all or part of the graphics service (250) may reside in the sketch input environment (210). For example, the sketch input environment (210) could be a tablet computer, and the tablet computer could perform all the sketch receiving and graphics service actions discussed herein. Alternatively, the graphics service (250) could be a service that is remote from the sketch input environment (210), such as a remote Web service.

III. Examples of Graphics from Sketches

Examples of generating and/or retrieving graphics from sketches will now be discussed with reference to illustrative user interface displays in FIGS. 3-9. Such user interface displays could be in various different user interface environments, such as part of one or more office productivity application user interfaces (spreadsheet application, word processing application, slide presentation application, etc.), a Web browser interface, a dedicated sketch-to-graphics application interface, a general operating system interface, etc. The user interfaces shown may be preceded by user input selecting the sketch-to-graphics feature being discussed. For example, a user may select a user interface control for sketch-to-picture and then enter a sketch to be used in obtaining a corresponding picture. As another example, a user may enter a sketch, and then select one of various options, such as sketch-to-picture, sketch-to-map, or sketch-to-chart. As yet another example, a user may input a sketch, and then generally select a sketch-to-graphics feature, relying on the computing device to analyze the sketch and determine whether it is a sketch for a chart, a picture, a map, etc. Also, note that these categories (chart, picture, map) may not be exclusive. For example, a sketch-to-picture feature may return a picture that is in the form of a map, or a picture that is in the form of a chart.

A. Examples of Pictures from Sketches

Figure 3:
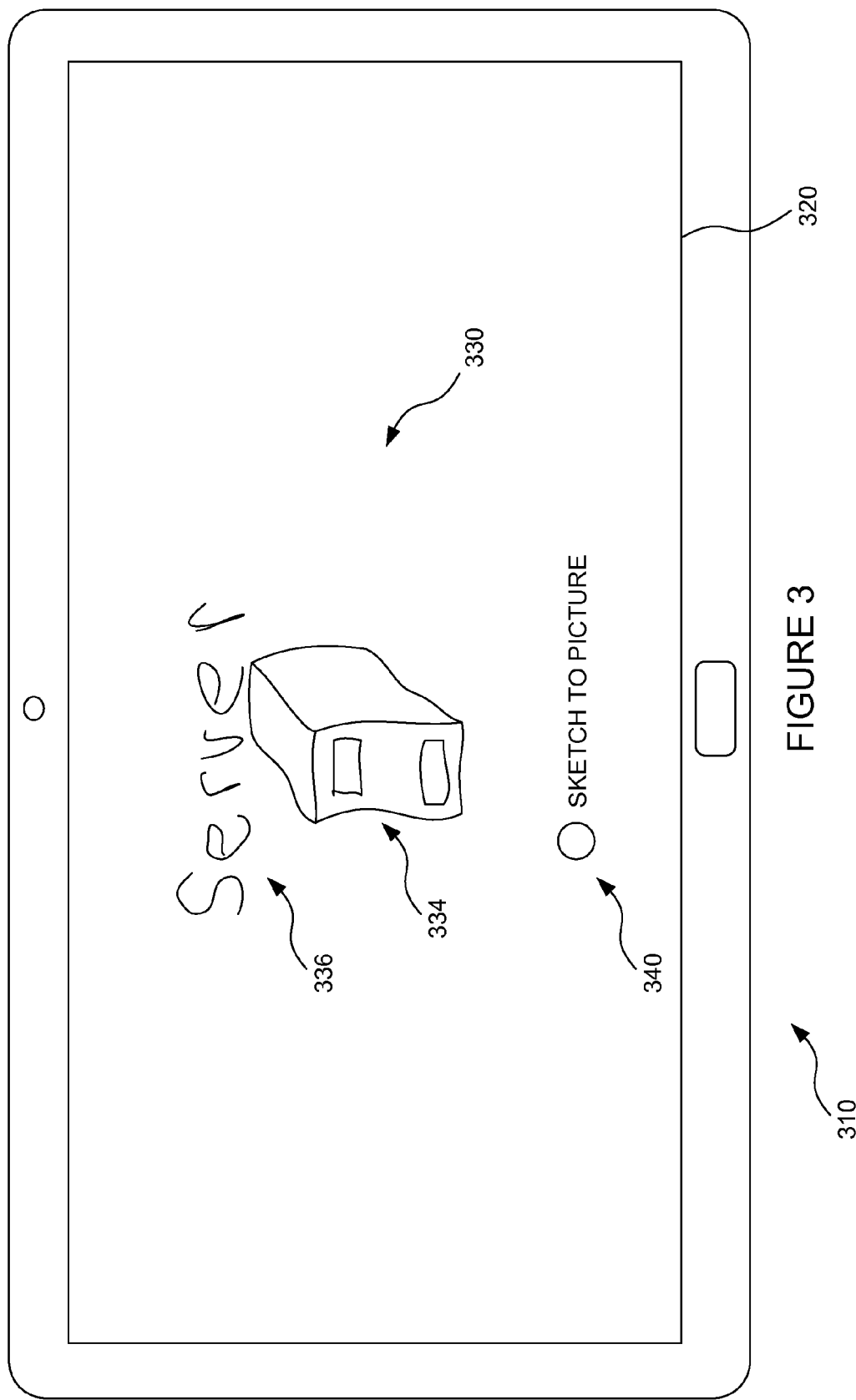
FIG. 3 is an illustration of a user device displaying a sketch.

Referring now to FIG. 3, an example of pictures from sketches will be discussed. FIG. 3 illustrates a user device (310) such as a tablet computer or mobile telephone. The user device can include a display (320), such as a touch screen. The display (320) can display a sketch (330), which could be entered by user input. For example, a user may have used a stylus or finger to draw the sketch freehand on the display (320). The sketch includes non-textual graphical element(s) or feature(s) (334). The sketch (330) also includes a sketched representation (336) of text that forms the word "Server". The display can also display a user interface control (340) that can be selected by user input to invoke the sketch-to-picture feature.

When the sketch-to-picture feature is invoked, the sketch (330) can be received for processing and a query can be automatically generated from the sketch (330). For example, a text recognition routine can perform pattern matching to recognize handwritten or typed (if part of the sketch (330) is not freehand) representations of text such as the representation (336). Additionally, a pattern-matching routine can analyze the non-textual graphical elements or features, such as the graphical element or feature (334) that represents a server computer. Accordingly, a query for pictures of server computers can be automatically generated. Additionally, the query may search for pictures that match the non-textual graphical features using graphical pattern matching routines that compare similarities between different pictures and a provided graphical feature from a sketch (e.g., graphical features such as color, orientation, etc.). For example, a library of items of different types may be assembled. For example, this may be done by extracting the information from existing databases of pictures, and using graphical features to form patterns from the items shown in the pictures with particular tags for types of items. Pictures may be scored using one or more search ranking features, such as similarity of graphical features, matches of picture tags to text derived from the sketch, popularity of the picture, etc. This pattern matching and querying may be performed locally on the device (310) and/or remotely at a graphics service environment. For example, the query may be run on a Web service that performs image searches of pictures.

Figure 4:
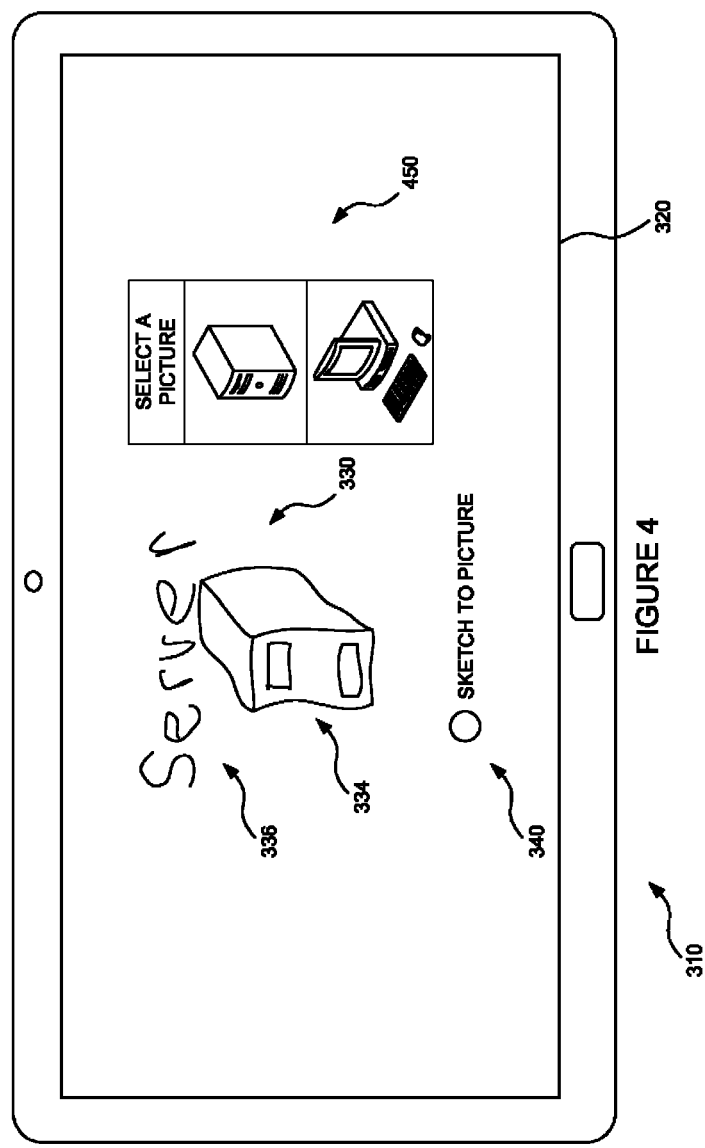
FIG. 4 is an illustration of the user device of FIG. 3 displaying pictures retrieved using the sketch of FIG. 3.
Figure 5:
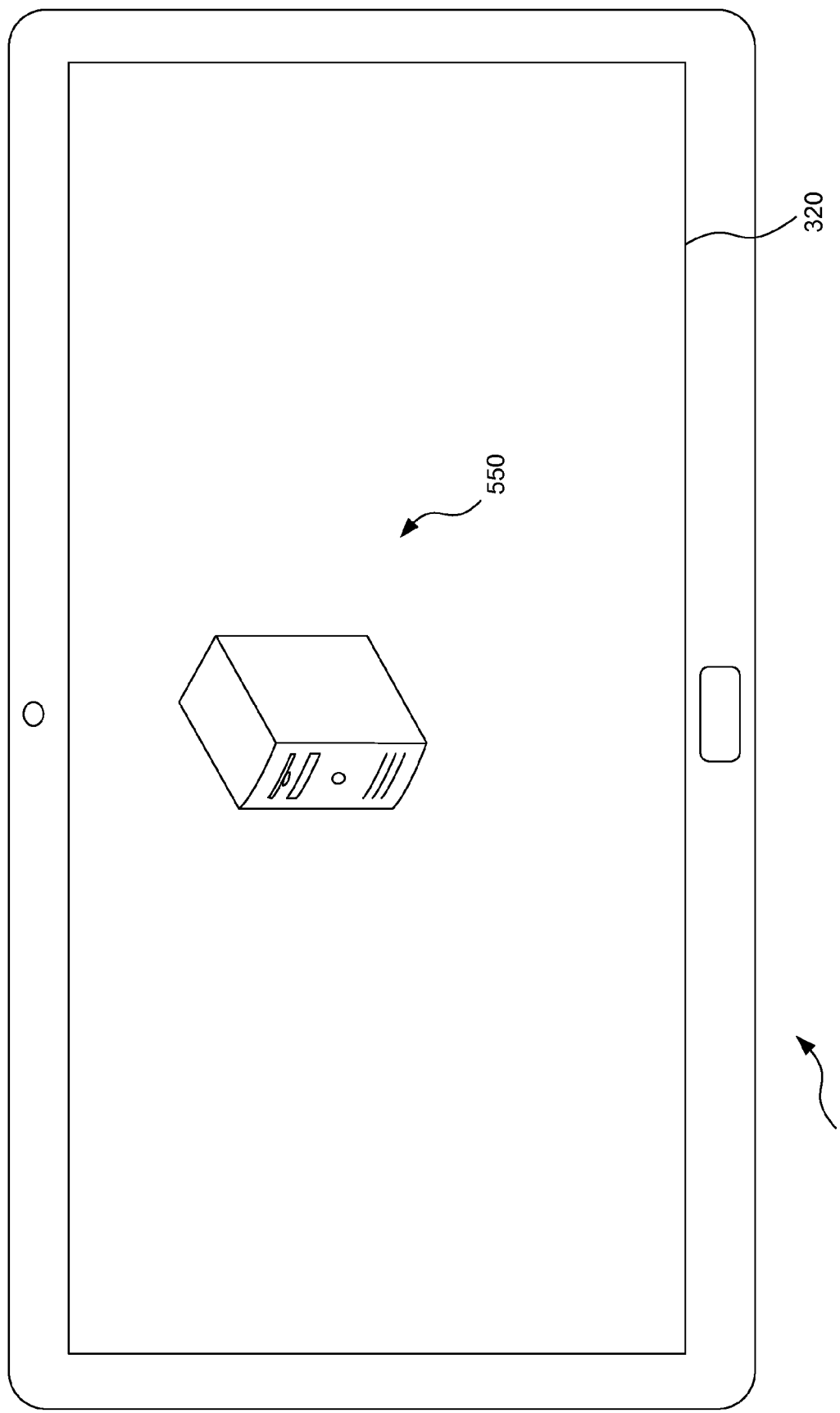
FIG. 5 is an illustration of the user device of FIG. 3 displaying a selected picture retrieved using the sketch of FIG. 3.

The sketch-to-picture feature may return only a single picture. Alternatively, multiple pictures (450) may be returned, allowing user input to be provided to select a desired picture. As another example, multiple returned pictures may be provided in groups, allowing user input to select a group, such as a group of a particular type of thing pictured. For example, the sketch could return a set of pictures for server computers and another set of pictures for restaurant servers. If a user selected the pictures for server computers, then the server computer pictures (those that have been tagged as server computers) can be shown on the display (320). As illustrated in FIG. 4, the multiple pictures (450) include two pictures of server computers. The pictures (450) illustrated in FIG. 4 are line drawings. However, the pictures could be digital photographs, non-photographic color illustrations, or other pictures. User input can be provided to select one of the pictures. Doing so can result in the sketch (330) being replaced with the selected picture (550) in the display (320), as illustrated in FIG. 5.

In some situations, there may be no pictures found that are able to be matched to the input sketch (330). If so, then a notice can be surfaced on the display (320), stating that no pictures were found. In other situations, additional user input may be requested to resolve ambiguities in the search. For example, if a sketch showed a circle with two radial lines extending outward from the center of the circle, a prompt may be raised asking the user which of various items was intended by the sketch (a watch, a clock, a pie chart, an actual pie, etc.). Upon receiving such input, the pertinent item(s) can be displayed (e.g., one or more pictures of watches, if a watch is selected). Similar techniques can be used for the sketch-to-map an sketch-to-chart features discussed herein.

B. Examples of Maps from Sketches

Figure 6:
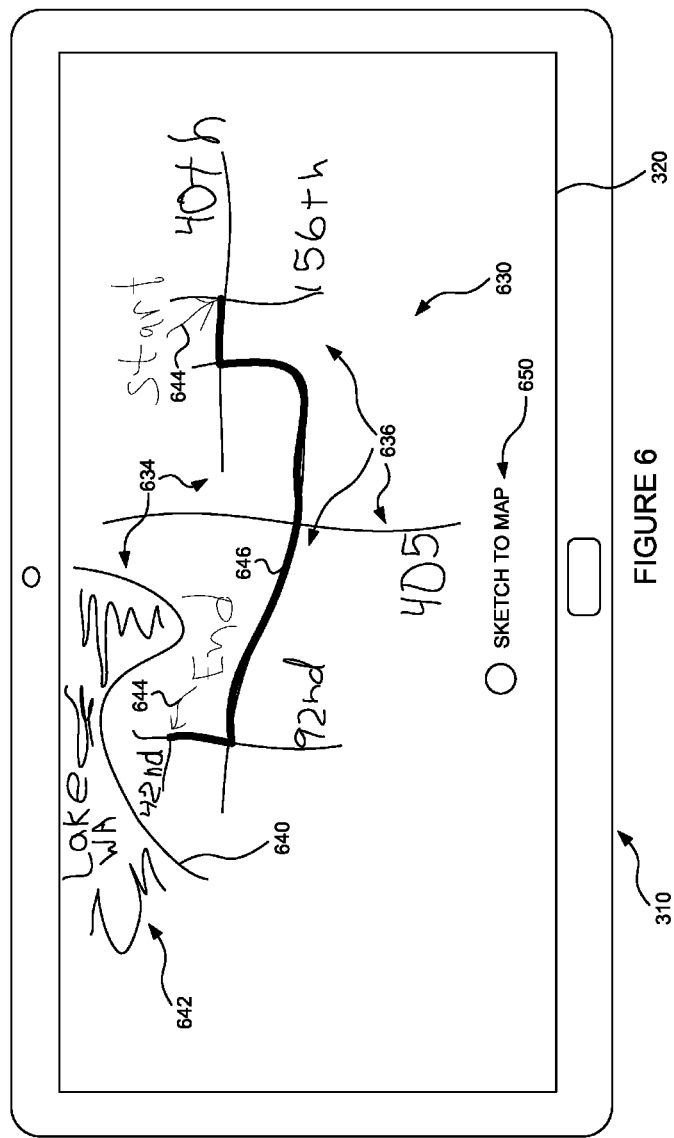
FIG. 6 is an illustration of the user device of FIG. 3 displaying another sketch.

Referring now to FIG. 6, an example of maps from sketches will be discussed. FIG. 6 illustrates the user device (310) with the display (320) showing a map sketch (630). The map sketch (630) includes non-textual graphical elements or features (634) and textual representations (636). The non-textual graphical features (634) include lines representing streets on the map, a line (640) representing a lake shoreline, some scribbled lines (642) representing the lake water, and arrow indicators (644) representing starting and ending points for a highlighted route. Colors can be used for the graphical features (634) to indicate properties of the graphical features. For example, the scribbled lines (642) could be colored blue to indicate that the scribbled lines (642) represent a body of water on the map sketch (630). Additionally, thicker lines (646), and/or lines of different colors, etc., can be used to highlight a route.

The textual representations (636) can include the names of streets, which may be abbreviated names, and may only include portions of the street names (e.g., "42nd" for 42nd Street, "405" for Interstate 405, etc.). The textual representations (636) may also include names of landmarks, such as the names of businesses for business locations, names of buildings, names natural geographical features (such as "Lake WA" in the map sketch (630)), etc. Additionally, textual representations (636) may be used to indicate the "Start" and "End" of a route, with graphical arrows (644) pointing to the start and end points of the route that can be indicated by a highlighted line (646). Alternatively, start and end points of a route could be indicated in other ways, such as with x's, circles, etc.

The display (320) can also display a user interface control (650), which can be selected to invoke the sketch-to-map feature. Selection of the user interface control (650) can result in the sketch (630) being received and analyzed to create a map service query from the sketch. For example, the graphical features (634) and the textual representations (636) of the sketch (630) can be identified (such as by using text recognition and graphical feature recognition with pattern recognition techniques) to indicate street names, landmarks, etc. that can be searched to locate the map region. Other information may also be used, such as a current location of the user device (310), as indicated by a global positioning system component of the user device (310). In the example of the sketch (630), for example, the map query can search for an area where a street with the term "40th" intersects a street with the term "156th". The map query can also search for an area where a street with the term "42nd", which is roughly parallel to the street with the term "40th", intersects a street with the term "92nd", which is roughly parallel to the street with the term "156th". The map query can also search for a street with the term "405" between the street with the term "92nd" and the term "156th". Additionally, the map query can search for a lake with a name, portion of a name, or abbreviation of "WA" near the intersection of the street with the term "92nd" and the street with the term "42nd". The map query can search for such information by including it in a query format that will be recognized and utilized by the map service. Such a query may take a form where the query indicates landmarks such as streets, bodies of water, buildings, etc., as well as their positions relative to each other on the sketch. For example, the relative positions may be expressed in terms of coordinates using a coordinate system overlaid on the sketch. The map query can be run to find a closest match to the query. The query may be biased toward locations near the current location of the user device (310), such as by beginning the query with locations near the location of the user device (310) and/or resolving ambiguities (where multiple locations are found that may match the map sketch (630)). The map service may rank multiple candidate map locations for correlation with the map sketch (630), and may select a map region that includes the highest ranking score. For example, the ranking may include combining scores from multiple ranking features, such as a feature for proximity to current location, a feature for matching text recognized from the map sketch, a feature for matching shapes from the map sketch, etc.

For example, with the map sketch (630), it may be found that the map corresponds closely to an area near Redmond and Bellevue, Wash. This determination could be aided if the user device (310) is already located in Redmond or Bellevue, or even in the nearby city of Seattle.

Figure 7:
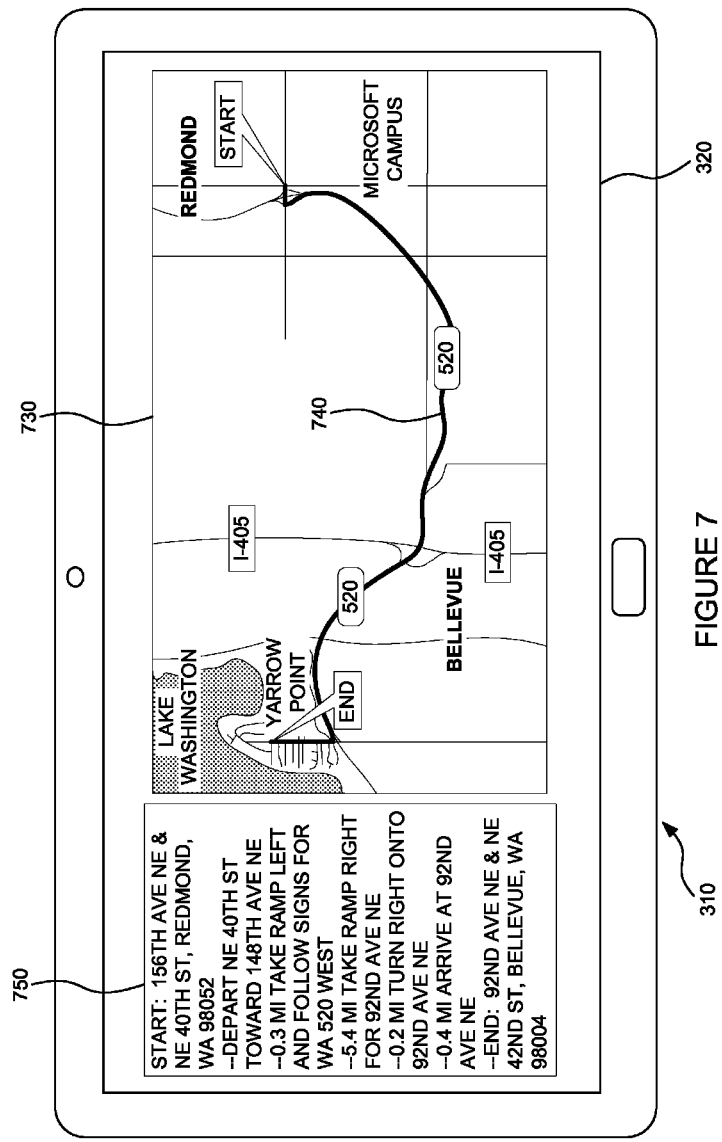
FIG. 7 is an illustration of the user device of FIG. 6 displaying a map and directions retrieved using the sketch of FIG. 6.

Referring now to FIG. 7, upon matching the pattern of the map sketch (630) to the pattern of a location, the map service can generate a map (730). The map (730) can be returned from the map service (which may be a local map service or a remote map service), and the map (730) can be displayed on the display (320). The map (730) can show the same area that was illustrated in the map sketch (630). Additionally, the map (730) can show a route (740), corresponding to and derived from the highlighted line (646) in the map sketch (630). The map (730) can also include a callout for the start of the route (740) and a callout for the end of the route (740).

The map (730) can include more details near the route (740) than farther away from the route (740). For example, the map (730) can indicate a business location "MICROSOFT CAMPUS" near the start of the route (740), and can indicate a town "YARROW POINT" near the end of the route (740), even though similar sized business locations and towns may not be indicated if they are farther away from the route (740). Similarly, more detailed lines representing roads are shown near the start and end of the route (740), and all the roads shown have at least a portion of the road near the route (740). The map (730) can be an interactive map, so that user input can be provided to zoom into or out of the map, pan across the map, etc.

In addition to the map (730), a list of directions (750) along the route (740) can be generated. The directions (750) can be presented, such as by including list of directions (750) on the display (320), as illustrated in FIG. 7. Alternatively or in addition to this listing, the list of directions (750) can be presented audibly by speaking the directions using an automated speech engine, or in some other manner.

C. Example of Charts from Sketches

Figure 8:
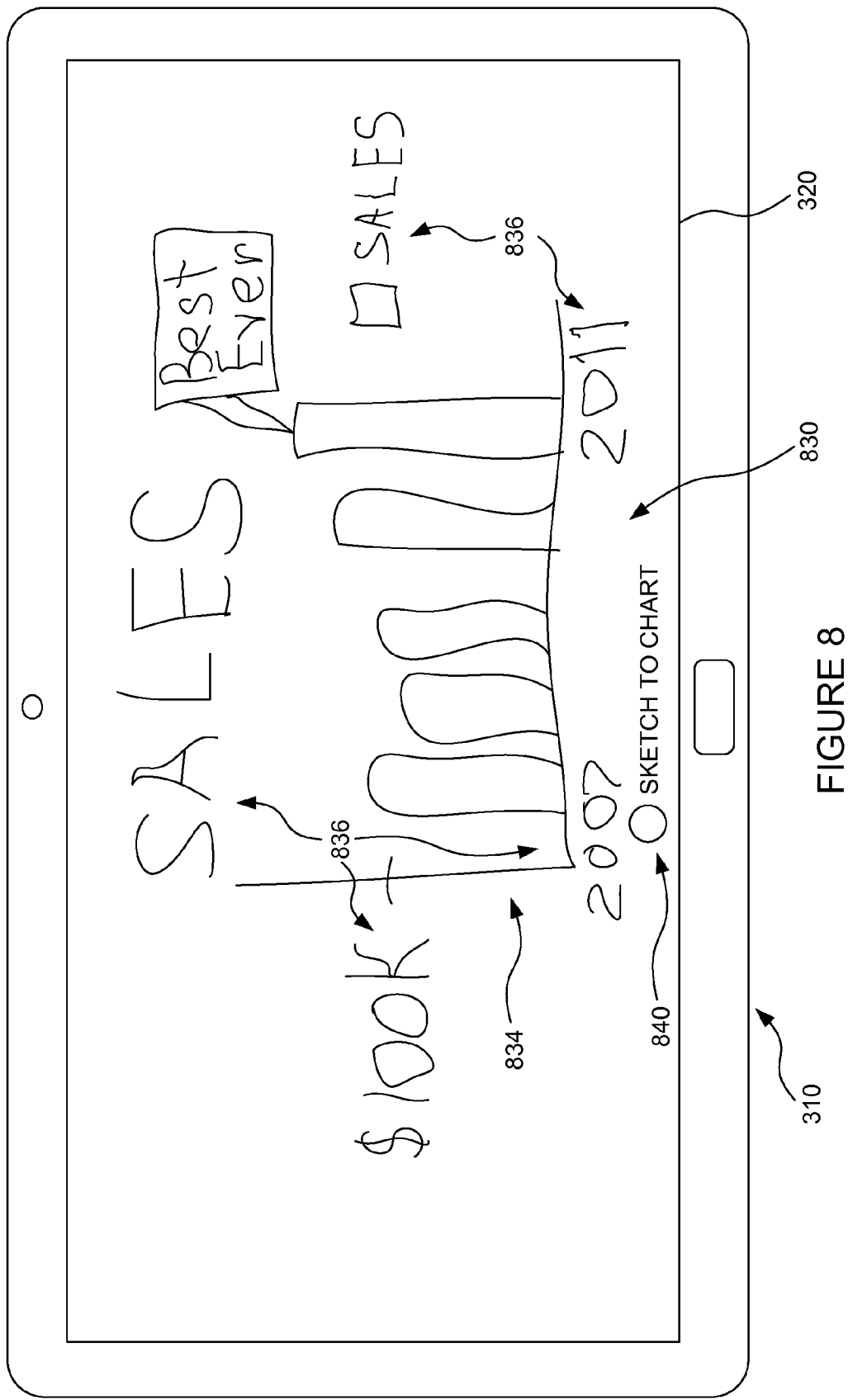
FIG. 8 is an illustration of the user device of FIG. 3 displaying another sketch.

Referring now to FIG. 8, an example of generating a chart from a sketch will be discussed. The display (320) of the user device (310) can display a sketch (830) entered with user input. The sketch (830) can include non-textual graphical elements or features (834), such as axes and columns for the column chart being illustrated in the sketch (830). The sketch (830) can also include sketched representations (836) of text. For example, in the illustration of FIG. 8, the textual representations (836) of the sketch (830) include a vertical axis label "$100 k", which can be interpreted as $100,000, next to a tick mark on the vertical axis. The textual representations (836) of the sketch (830) can also include horizontal axis labels that include "2007" below a left-most chart column and "2011" below a right-most chart column of the five chart columns illustrated in the sketch (830). The sketch (830) can also include a chart legend to the side of a main portion of the sketched column chart, which includes a sketched representation of the word "SALES", in addition to a title at the top center of the sketch (830) that also includes a sketched representation of the word "SALES".

The display (320) can also display a user interface control (840), which can be selected to invoke a sketch-to-chart feature. Selection of the user interface control (840) can result in an analysis of the sketch (830) to generate a chart. For example, the analysis can include recognition of the representations (836) of text, as well as pattern matching of the non-textual graphical features (834). For example, the pattern matching can match the textual representations (836) and the non-textual graphical features (834) to determine what type of chart is intended. Additionally, values can be interpolated and/or extrapolated from existing values. For example, it can be determined that the sketch (830) matches a general pattern for a column chart. Additionally, it can be determined that the "SALES" in the top center matches the pattern for a chart title, and that the square and the sketched term "SALES" to the right of the main chart matches the pattern for a chart legend. It can also be determined that the "Best Ever" text matches the format of a callout pointing to the farthest-right column Additionally, the textual representation "2007" on the left of the horizontal axis and the "2011" on the right of the horizontal axis can be matched with horizontal axis labels. Additionally, values can be interpolated between 2007 and 2011 to yield the intervening horizontal axis labels 2008, 2009, and 2010.

Additionally, the "$100 k" next to a tick mark on the vertical axis can be determined to match a pattern for a vertical axis value of $100,000. That value can be used to produce a new value for each of the chart columns. For example, it may be determined the extent to which each column extends above a height of the $100 k tick mark or falls short of the height of the $100 k tick mark. A proportional value can be produced for each corresponding column in that manner. These pattern matching and computation techniques can yield a dataset that includes the determined values. The dataset can be used to generate a chart that is linked to values in the dataset. For example, the type of chart from pattern matching the sketch (830) (column chart in the example) may be dictated to a chart engine, and the dataset may be provided to the chart engine to produce the chart.

Figure 9:
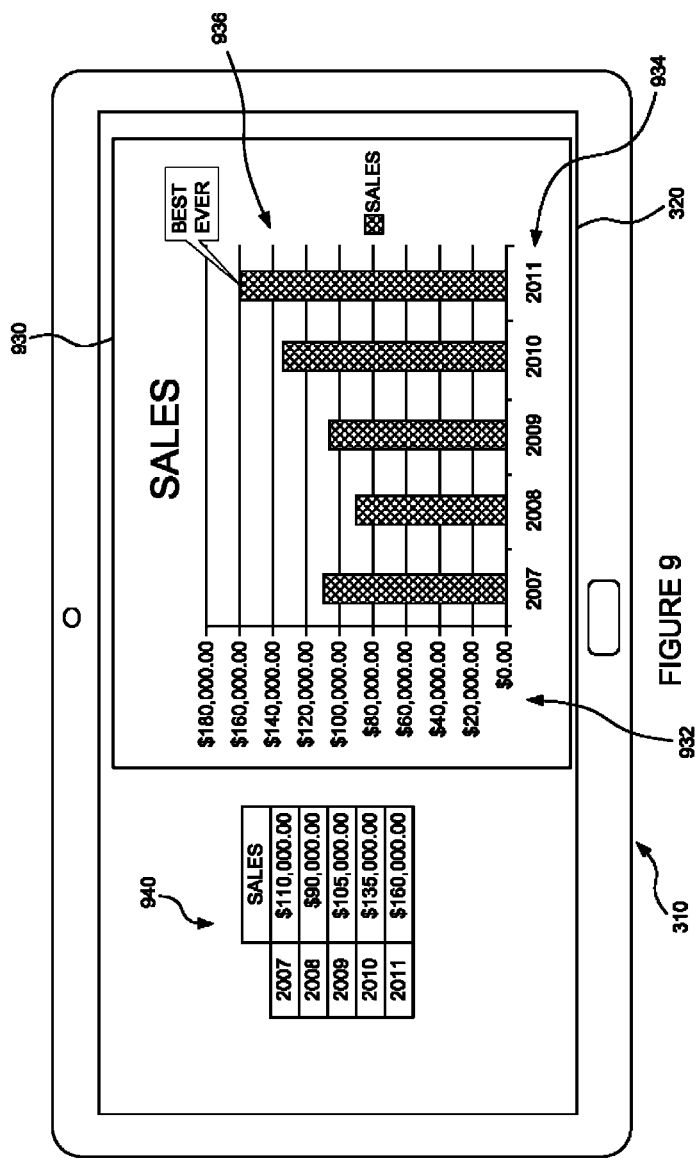
FIG. 9 is an illustration of the user device of FIG. 8 displaying a chart retrieved using the sketch of FIG. 8.

For example, referring now to FIG. 9, an example of a possible display from the sketch (830) is illustrated. The display (320) of the device (310) can display a formatted chart (930), which can include vertical axis value labels (932), horizontal axis value labels (934), as discussed above, as well as a title "SALES", a legend that states "SALES" and has a pattern sample that corresponds to a pattern of columns (936) for the chart (930), and a callout with the text "Best Ever" pointing to the top of the right-most column. The display (320) can also display a dataset (940) underlying the chart. For example, the dataset (940) can be displayed in the form of a table having a table column for the horizontal axis labels, a corresponding table column for the values of the corresponding chart columns, and a header "SALES" above the chart column values.

The chart (930) and the display of the dataset (940) can be interactive. Accordingly, user input can be provided to change a value in the dataset (940), and that change can result in a corresponding change on the chart (930). Similarly, a change on the chart (930) may result in a corresponding change in the dataset (940). For example, an additional callout can be sketched on the chart (930), and the entry of the sketched callout can result in a formatted callout being automatically added to the chart (930). As another example, user input could drag one of the chart columns up or down, and that change could result in a corresponding change to the corresponding value in the dataset (940). As yet another example, one of the chart column values in the dataset (940) could be changed in response to user input, and that change can result in a corresponding change to the height of the corresponding chart column.

Similar sketch-to-chart techniques can be performed for other types of charts, such as bar charts, line charts, pie charts, organizational charts, scatter charts, area charts, bubble charts, etc.

IV. Sketch-Based Graphics Retrieval Techniques

Several sketch-based graphics retrieval techniques will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable storage media may have computer-executable instructions embodied thereon that, when executed by at least one processor, cause at least one processor to perform the technique. The techniques discussed below may be performed at least in part by hardware logic.

Figure 10:
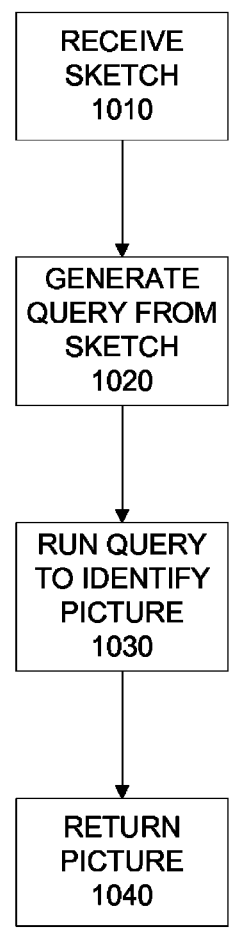
FIG. 10 is a flowchart of a sketch-based graphics retrieval technique.

Referring to FIG. 10, a sketch-based graphics retrieval technique will be discussed. The technique can include receiving (1010) a graphical sketch, such as a sketch that is partially or fully freehand. The sketch can include one or more representations of text. The technique can also include automatically generating (1020) a query from the sketch. Generating (1020) can include automatically recognizing the text represented in the sketch and automatically representing the text in the query. The technique of FIG. 10 can include running (1030) the query to identify a picture in response to the query. The text represented in the sketch can describe one or more non-textual features of the identified picture. The picture can be returned (1040). As with the other techniques discussed herein, the all or any combination of the acts of the technique following receipt of the sketch may be done as automatic acts in response to receiving the sketch (which could be by receiving sketch input in addition to a user input (e.g., selecting a user interface control) indicating the sketch is to be used for some type of sketch-based graphics retrieval, such as retrieving a picture, generating a map, generating a chart, etc.). Accordingly, once the user input is provided to indicate that the sketch is to be used to generate/retrieve the graphics (picture/chart/map, etc.), the graphics can be automatically generated without additional user input, although such additional user input may be provided in some situations (e.g., where the user input is requested to resolve an ambiguity).

The picture may be a picture that does not include the text represented in the sketch. The sketch may also include one or more graphical representations of one or more graphical features of the picture. Automatically generating the query can include automatically identifying a type of item represented by one or more graphical elements of the sketch, and include one or more textual representations of the type of item in the query. Automatically identifying the type of item can include performing pattern matching on the graphical element(s). Automatically generating the query can include automatically performing pattern matching on one or more graphical elements of the sketch and automatically performing text recognition on the one or more sketched representations of the text.

The picture may be a photograph, or some other type of picture such as a line drawing, a shaded drawing, or some other type of picture. The sketch may include a color (e.g., one or more sketched lines in a color), and the query can include a textual representation of that color. For example, the sketch may include red scribbled lines in an area, and the query can search for a picture that includes red in the area of the scribbled lines (which could be indicated in metadata associated with the pictures or identified by analyzing the pictures).

Running (1030) the query can identify a plurality of pictures, and the text can describe one or more non-textual features of each of the plurality of pictures. The method may include returning the plurality of pictures. The pictures may be ranked according to how well each picture correlates with the sketch according to a ranking system. User input may be received to select one or more of the plurality of pictures that are returned. In response to the user input, the technique can include inserting the selected picture(s) into a document.

The technique may include displaying a digital document. Receiving (1010) the sketch can include receiving user input defining the sketch at the displayed document (e.g., by receiving touch-based input in a display area where the document is displayed). The technique can further include entering the returned picture into the document.

The technique of FIG. 10 and the other techniques discussed herein may be performed in whole or in part by hardware logic.

Figure 11:
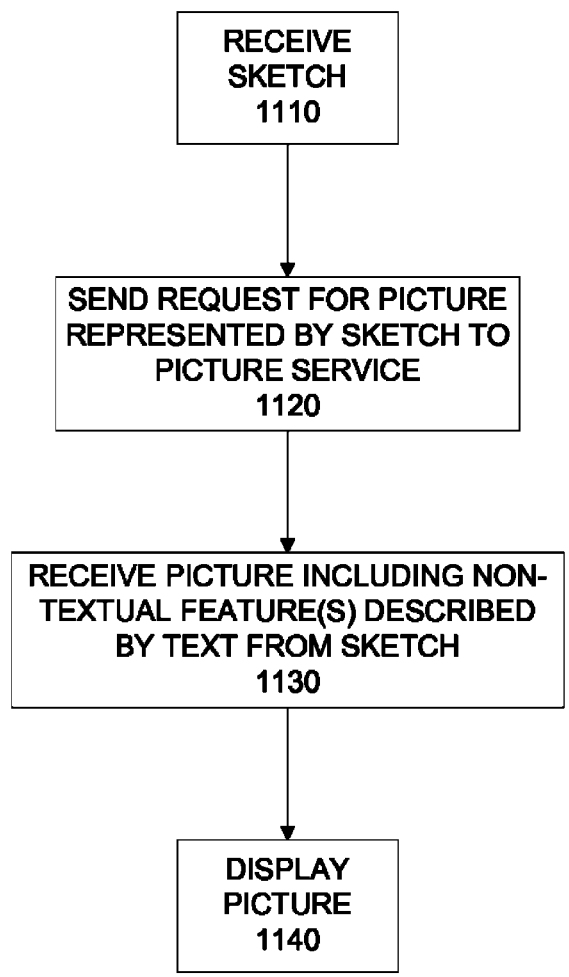
FIG. 11 is a flowchart of another sketch-based graphics retrieval technique.

Referring now to FIG. 11, another sketch-based graphics retrieval technique will be discussed. The technique can include receiving (1110) a graphical sketch including one or more sketched representations of text. A request can be sent (1120) to a picture service, requesting that the picture service return a picture represented by the sketch. A picture can be received (1130) from the picture service in response to the request. The picture can include one or more non-textual features described by the text represented in the sketch. Additionally, the technique of FIG. 11 can include displaying (1140) the picture.

Receiving (1130) the sketch can include receiving user input defining the sketch at a displayed digital document. Additionally, displaying (1140) the picture can include displaying the picture in the document (e.g., in a word processing document, a spreadsheet document, slide presentation document, etc.).

The request to the picture service can include an image of the sketch and/or a query generated from the sketch. The request to the picture service may request that the picture service run the query and/or analyze the sketch. The picture may be a picture that does not include the text represented in the sketch, and the picture may not include any text. The sketch can include one or more graphical representations of one or more graphical features of the picture. The picture service may be a remote service and/or a local service.

Figure 12:
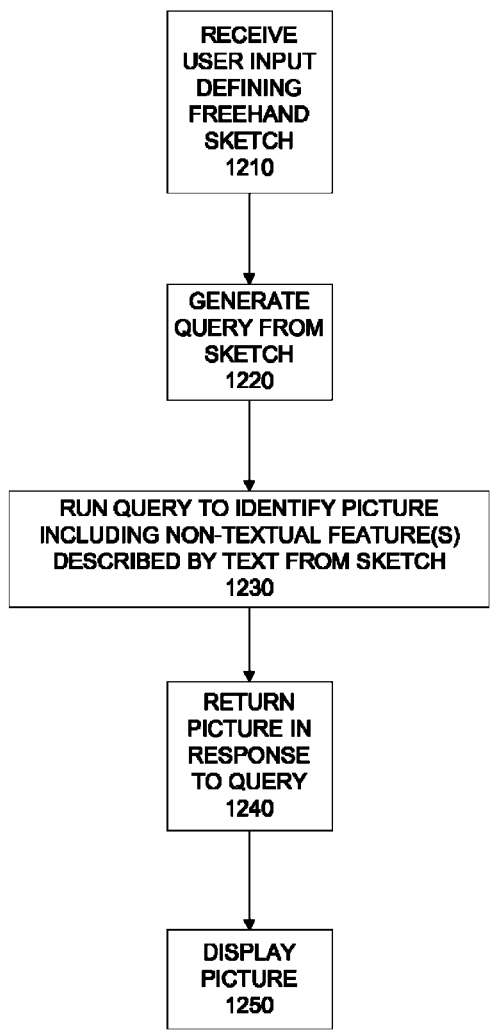
FIG. 12 is a flowchart of yet another sketch-based graphics retrieval technique.

Referring now to FIG. 12, yet another sketch-based graphics retrieval technique will be discussed. The technique can include receiving (1210) user input defining a freehand graphical sketch on a computer display. Alternatively, the sketch may be partially freehand. The user input can include touch input drawing the sketch and the sketch can include one or more sketched graphical representations and one or more sketched representations of text. A query can be automatically generated (1220) from the sketch. Generating (1220) can include automatically recognizing the text and automatically representing the text in the query. Additionally, generating may include pattern matching the one or more graphical representations. The query can be run (1230) to identify a picture in response to the query. The text can describe one or more non-textual features of the picture and the picture may not include the text. The one or more graphical representations can be one or more graphical representations of one or more graphical features depicted in the picture. The picture can be returned (1240) in response to the query, and the picture can be displayed (1250) on the computer display in response to the picture being returned.

Figure 13:
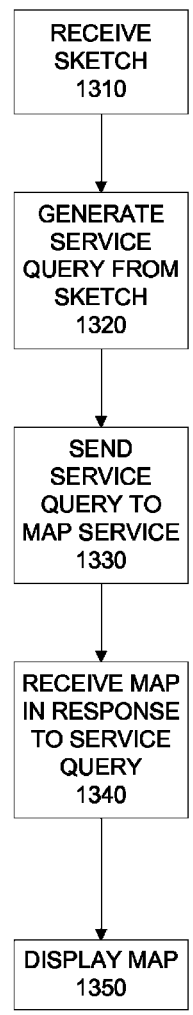
FIG. 13 is a flowchart of yet another sketch-based graphics retrieval technique.

Referring now to FIG. 13, yet another sketch-based graphics retrieval technique will be discussed. The technique can include receiving (1310) a sketch that includes one or more sketched graphical elements. A service query can be automatically generated (1320) from the sketch. The service query can be automatically sent (1330) to a map service, and a map can be received (1340) in response to the service query. Additionally, the map can be displayed (1350).

The map service can be a remote service and/or a local service. The sketch may include a representation of a first location and a representation of a second location. The technique of FIG. 13 may further include receiving a list of directions from the map service. The directions can include word-based directions (such as text-based or audio-based directions) from the first location to the second location. The technique can further include presenting the directions.

The sketch may include one or more representations of text and the service query may also include one or more representations of text. The map may include one or more features described in the text. The text can describe a landmark. The service query can include a request to include the landmark in the map. The map may include a representation of the landmark, even if a map from the map service would not include the landmark if the service query had not included the request to include the landmark in the map.

The one or more sketched graphical elements can represent one or more features graphically represented on the map. The one or more sketched graphical elements can include a sketch of a route from a first location to a second location, and the map can highlight the route. The map may include an increased level of detail closer to the route and a decreased level of detail farther from the route.

The service query may include the sketch. Additionally, the service query can include information in addition to the sketch. The information can include information about a current location of a device that received the sketch.

Automatically generating (1320) the service query can include analyzing the sketch to produce the service query. The service query can include one or more textual elements representing one or more graphical elements of the sketch.

Figure 14:
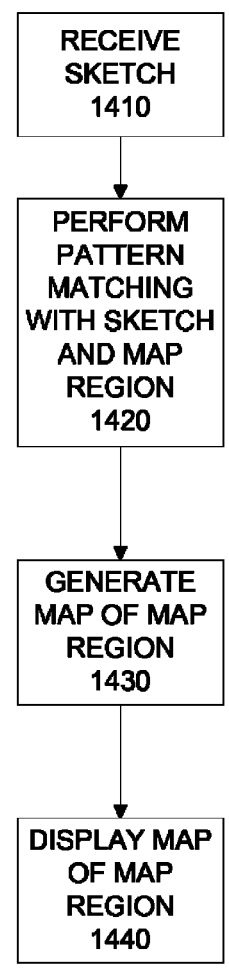
FIG. 14 is a flowchart of yet another sketch-based graphics retrieval technique.

Referring now to FIG. 14, yet another sketch-based graphics retrieval technique will be discussed. The technique can include receiving (1410) a sketch that includes one or more sketched graphical elements and one or more sketched representations of text. Pattern matching of a map region with one or more of the sketched graphical element(s) and the sketched representation(s) of text can be automatically performed (1420). A map of the map region can be automatically generated (1430) and displayed (1440).

The map region may be a selected map region that is selected from a plurality of potential map regions. Automatically performing (1420) pattern matching can include automatically ranking the plurality of map regions for correlation to the one or more sketched graphical elements and the one or more sketched representations of text. The selected map region can be a region that ranks highest in the automatic ranking among the plurality of map regions.

As with other sketches discussed herein, the sketch of the FIG. 14 technique may be a fully or partially freehand sketch. For example, the sketch may include some free-hand sketched elements and other elements (such as typed text and/or predefined graphical elements) that are not free-hand sketched. The sketch can represent a route from a first location to a second location, and the map can highlight the route from the first location to the second location. The technique can additionally include automatically generating directions from the first location to the second location along the route. The technique may also include presenting the directions.

The technique of FIG. 14 may also include adding information from the sketch to a database of map data, such as map data maintained by a mapping service for use in responding to requests for maps. After generating (1430) the map (which can be termed a first map), map requests can be received (for example, in the form of a service query to the mapping service). The sketch may have also been included in an initial map request (which could also have been in the form of a service query to a mapping service), and the first map may be been generated in response to that initial map request. In response to these map requests after generating (1430) the first map, additional maps can be generated, which generation may be performed by the mapping service. These additional maps can include the added information from the sketch.

Figure 15:
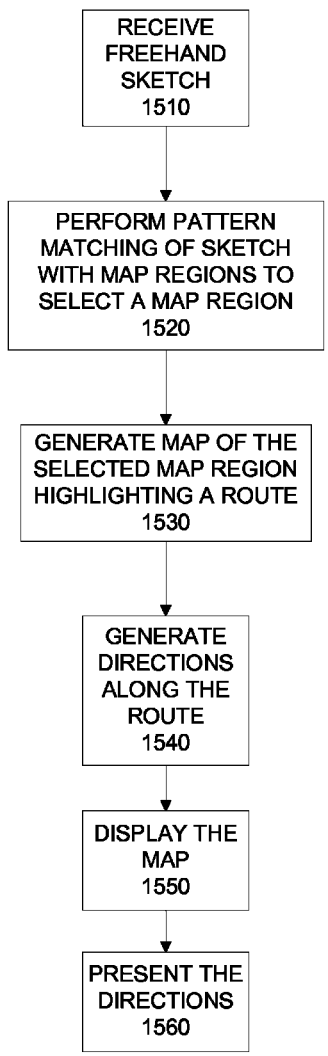
FIG. 15 is a flowchart of yet another sketch-based graphics retrieval technique.

Referring now to FIG. 15 another sketch-based graphics retrieval technique will be discussed. The technique can include receiving (1510) a freehand sketch that includes one or more sketched graphical elements and one or more sketched representations of text. The sketch can represent a route from a first location to a second location. The technique can also include automatically performing (1520) pattern matching of the one or more sketched graphical elements and the one or more sketched representations of text with a map region. The map region can be a selected map region selected from a plurality of potential map regions. Automatically performing pattern matching can include automatically ranking the plurality of map regions for correlation to the one or more sketched graphical elements and the one or more sketched representations of text. The selected map region can be a map region ranking highest among the plurality of map regions. A map of the map region can be automatically generated (1530). The map can highlight the route from the first location to the second location. Word-based directions from the first location to the second location along the route can be automatically generated (1540). Additionally, the map of the map region can be displayed (1550), and the directions from the first location to the second location can be presented (1560).

Figure 16:
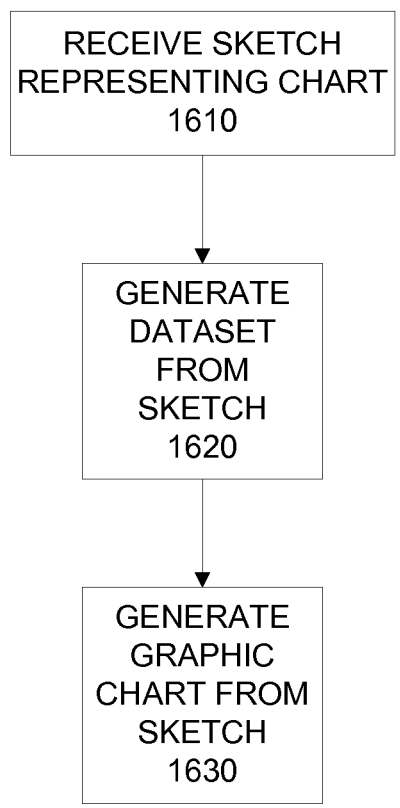
FIG. 16 is a flowchart of yet another sketch-based graphics retrieval technique.

Referring now to FIG. 16, yet another sketch-based graphics retrieval technique will be discussed. The technique can include receiving (1610) a sketch including a graphical chart representation. A dataset can be automatically generated (1620) from the sketch. A graphical chart can also be automatically generated (1630) from the sketch. The graphical chart can represent the sketch, and the dataset can include data represented in the graphical chart.

The dataset can be in the form of a table. The technique can include displaying the graphical chart and the dataset in a user interface for a single application. For example, the single application can include a spreadsheet application. The sketch can be at least partially freehand. Generating (1630) the graphical chart from the sketch can include automatically selecting a type of chart that is represented by the sketch. Also, automatically selecting the type of chart can include performing one or more pattern matching techniques using one or more graphical elements of the sketch.

Generating (1620) the dataset can include automatically deriving one or more new data values from one or more data values represented in one or more textual representations in the sketch. Automatically deriving can include performing a derivation computation selected from a group consisting of interpolation, extrapolation, and combinations thereof. The automatically deriving of new data value(s) can use at least one graphical feature of the sketch. The at least one graphical feature can be selected from a group consisting of a position of a graphical element, a size of a graphical element, and combinations thereof. The one or more new data values can be represented by one or more graphical elements of the chart, and the new data values may also represent one or more graphical elements of the sketch.

Automatically generating (1630) the graphical chart can include automatically generating the graphical chart from the dataset, the dataset being generated from the sketch. The sketch may represent one or more callouts, and the chart may also include one or more callouts. The technique of FIG. 16 may further include receiving user input sketching a representation of a modification to the chart, and in response to the user input sketching the representation of the modification to the chart, making the modification to the chart.

Figure 17:
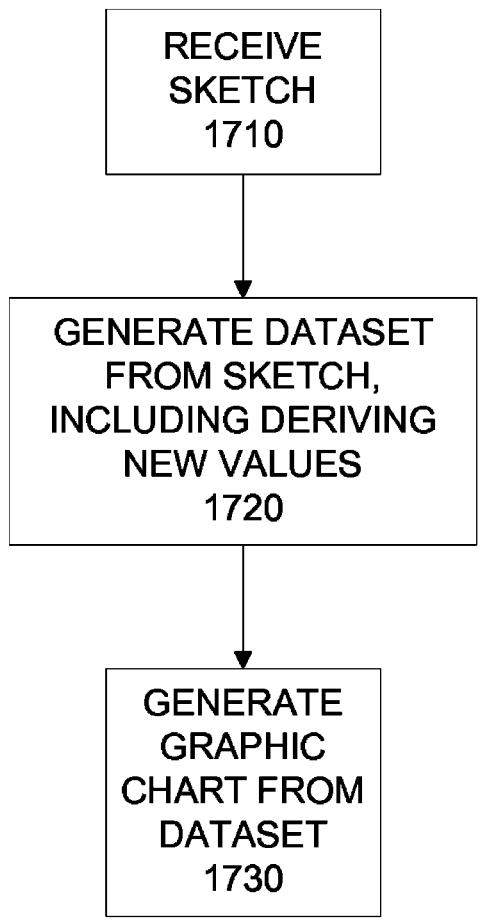
FIG. 17 is a flowchart of yet another sketch-based graphics retrieval technique.

Referring now to FIG. 17, yet another sketch-based graphics retrieval technique will be discussed. The technique can include receiving (1710) a sketch that is at least partially freehand, the sketch including a graphical chart representation. A dataset can be automatically generated (1720) from the sketch, and this generating (1720) can include deriving one or more new data values not represented by textual representations in the sketch. Additionally, a graphical chart can be automatically generated (1730) from the dataset.

Deriving the new data value(s) can include deriving the new data value(s) from one or more existing data values represented by one or more textual representations in the sketch. Deriving the one or more new data values may include making one or more assumptions about one or more data values represented by one or more graphical elements of the sketch. For example, if a line chart includes no values, then an assumption can be made about a value of one point on the line (e.g., set the value to the number one), and other values can be extrapolated from that point based on the positions of other points on the line(s) in the sketch. Generating (1730) the graphical chart from the dataset can include automatically selecting a type of chart that is represented by the sketch. Automatically selecting the type of chart can include performing one or more pattern matching techniques using one or more graphical elements of the sketch.

Figure 18:
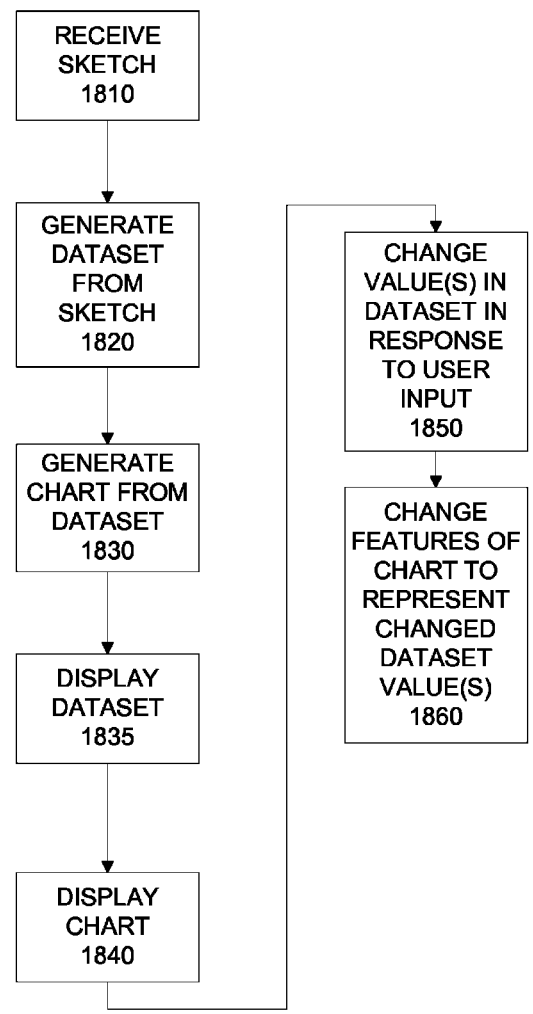
FIG. 18 is a flowchart of yet another sketch-based graphics retrieval technique.

Referring now to FIG. 18, yet another sketch-based graphics retrieval technique will be discussed. The technique can include receiving (1810) a sketch that is at least partially freehand. The sketch can include a graphical chart representation. A dataset can be automatically generated (1820) from the sketch. Automatically generating (1820) the dataset can include deriving one or more new data values not represented by textual representations in the sketch. The technique of FIG. 18 can also include automatically generating (1830) an interactive graphical chart from the dataset and the sketch. Generating (1830) the graphical chart can include automatically selecting a type of chart that is represented by the sketch using one or more pattern matching techniques with one or more graphical elements of the sketch. The chart can include one or more graphical elements that represent the one or more new data values. The technique of FIG. 18 can further include displaying (1835) the dataset and displaying (1840) the chart. One or more values in the dataset can be changed (1850) in response to user input. One or more features of the chart can be automatically changed (1860) to represent the one or more changed values in the dataset.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A computer system comprising:
   at least one processor; and
   memory comprising instructions stored thereon that when executed by at least one processor cause at least one processor to perform acts comprising:
   receiving a digital graphical sketch;
   automatically generating a computer-readable query from the sketch, the automatic generating of the computer-readable query from the sketch comprising automatically performing text recognition on one or more sketched representations of text in the sketch;
   identifying a graphical ambiguity in the sketch, with the graphical ambiguity being an ambiguity as to what type of item is depicted by one or more non-textual graphical elements of the sketch, and with identifying the graphical ambiguity comprising deriving a plurality of alternative meanings from the one or more non-textual graphical elements of the sketch;
   identifying a meaning for the sketch from among the plurality of alternative meanings;
   running the query to identify one or more digital pictures in response to the query; and
   returning results of the query, the acts comprising limiting the returned results of the query to those corresponding to the identified meaning for the sketch, the returned results of the query comprising a picture that is representative of the graphical sketch and that corresponds to the identified meaning for the sketch.

2. The system of claim 1, wherein the picture does not include the text.

3. The system of claim 1, wherein the sketch comprises one or more graphical representations of one or more graphical features of the picture.

4. The system of claim 1, wherein automatically generating the query comprises automatically identifying a type of item represented by one or more graphical elements of the sketch and including one or more textual representations of the type of item in the query, wherein automatically identifying the type of item comprises performing pattern matching on the one or more graphical elements.

5. The system of claim 1, wherein automatically generating the query comprises automatically performing pattern matching on one or more graphical elements of the sketch.

6. The system of claim 1, wherein the picture is a photograph.

7. The system of claim 1, wherein the sketch comprises a color and the query comprises a textual representation of the color.

8. The system of claim 1, wherein the running of the query comprises identifying a plurality of pictures, wherein the one or more sketched representations of text in the sketch describe one or more non-textual features of each of the plurality of pictures, and wherein the acts further comprise returning the plurality of pictures.

9. The system of claim 8, wherein the acts further comprise:
   receiving user input selecting one or more of the plurality of pictures; and
   in response to the user input selecting the one or more of the plurality of pictures, inserting the one or more of the plurality of pictures into a document.

10. The system of claim 1, wherein the acts further comprise displaying a digital document, wherein receiving the sketch comprises receiving user input defining the sketch at the displayed document, and wherein the acts further comprise entering the picture from the returned results into the document.

11. The computer system of claim 1, wherein the one or more sketched representations of text in the sketch comprise a handwritten representation of text in the sketch and the performance of the text recognition comprises performing pattern matching on the handwritten representation of text in the sketch.

12. A computer-implemented method comprising:
receiving a digital graphical sketch;
identifying a graphical ambiguity in the sketch, with the graphical ambiguity being an ambiguity as to what type of item is depicted by one or more non-textual graphical elements of the sketch, and with identifying the ambiguity comprising deriving a plurality of alternative meanings from the one or more non-textual graphical elements of the sketch;
requesting user input to choose a meaning for the sketch, the request for user input identifying the plurality of alternative meanings;
receiving user input in response to the request for user input, the received user input choosing a meaning for the sketch;
sending a computer-readable request to a computer picture service, the request requesting that the picture service return at least one digital picture represented by the sketch;
receiving one or more digital pictures from the picture service in response to the computer-readable request; and
displaying the one or more pictures on a computer display, the method comprising limiting the displayed one or more pictures to those corresponding to the chosen meaning for the sketch, the one or more pictures that are displayed comprising a picture that is representative of the graphical sketch and that corresponds to the chosen meaning for the sketch.

13. The method of claim 12, wherein receiving the sketch comprises receiving user input defining the sketch at a displayed digital document, and wherein displaying the one or more pictures comprises displaying the picture in the document.

14. The method of claim 12, wherein the request to the picture service comprises an image of the sketch.

15. The method of claim 12, wherein the request to the picture service comprises a query generated from the sketch, the request to the picture service requesting that the picture service run the query.

16. The method of claim 12, wherein the sketch comprises one or more representations of text, and wherein the picture does not include the text.

17. The method of claim 12, wherein the sketch comprises one or more graphical representations of one or more graphical features of the picture.

18. The method of claim 12, wherein the service is a remote service.

19. The method of claim 12, wherein the method further comprises automatically performing text recognition on one or more sketched representations of text in the sketch, wherein the request comprises one or more textual representations of the one or more sketched representations of text, and wherein the one or more representations of the one or more sketched representations of text are derived from the text recognition.

20. One or more computer-readable storage media having computer-executable instructions embodied thereon that, when executed by at least one processor, cause at least one processor to perform acts comprising:
receiving user input defining a freehand digital graphical sketch on a computer display;
automatically generating a computer-readable query from the sketch, the automatic generating of the computer-readable query from the sketch comprising automatically performing text recognition on one or more sketched representations of text in the sketch;
identifying a graphical ambiguity in the sketch, with the graphical ambiguity being an ambiguity as to what type of item is depicted by one or more non-textual graphical elements of the sketch, and with identifying the ambiguity comprising deriving a plurality of alternative meanings from the one or more non-textual graphical elements of the sketch;
requesting user input to choose a meaning for the sketch, the request for user input identifying the plurality of alternative meanings;
receiving user input in response to the request for user input, the received user input choosing a meaning for the sketch;
running the query to identify one or more digital pictures in response to the query;
returning results in response to the query; and
displaying one or more pictures from the results on the computer display in response to the results being returned, the acts comprising limiting the displayed one or more pictures to those corresponding to the chosen meaning for the sketch, the one or more displayed pictures comprising a picture that is representative of the graphical sketch and that corresponds to the chosen meaning for the sketch.

* * * * *